United States Patent
Liu et al.

(10) Patent No.: US 9,478,242 B1
(45) Date of Patent: Oct. 25, 2016

(54) MAGNETIC RECORDING APPARATUS HAVING A RECESSED ADDITIONAL POLE SEGMENT

(71) Applicant: Western Digital (Fremont), LLC, Fremont, CA (US)

(72) Inventors: Feng Liu, San Ramon, CA (US); Yi Wang, Moutain View, CA (US); Zhanjie Li, Pleasanton, CA (US); Peng Luo, San Ramon, CA (US); Zhigang Bai, Fremont, CA (US); Yang Xiang, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/081,694

(22) Filed: Mar. 25, 2016

(51) Int. Cl.
G11B 5/33 (2006.01)
G11B 5/60 (2006.01)
G11B 5/127 (2006.01)
G11B 5/187 (2006.01)

(52) U.S. Cl.
CPC ........... *G11B 5/6082* (2013.01); *G11B 5/1272* (2013.01); *G11B 5/187* (2013.01)

(58) Field of Classification Search
CPC .......... G11B 5/33; G11B 5/147; G11B 5/187
USPC ............. 360/125.15, 125.3, 125.03, 125.09, 360/125.04, 125.17, 125.16, 125.06
See application file for complete search history.

(56) References Cited

U.S. PATENT DOCUMENTS

| | | |
|---|---|---|
| 6,055,138 A | 4/2000 | Shi |
| 7,009,812 B2 | 3/2006 | Hsu et al. |
| 7,099,121 B2 | 8/2006 | Parker et al. |
| 7,307,814 B1 | 12/2007 | Seagle et al. |
| 7,593,183 B2 | 9/2009 | Hsiao et al. |
| 7,793,406 B2 | 9/2010 | Zheng |
| 7,889,456 B2 | 2/2011 | Jiang et al. |
| 7,990,652 B2 | 8/2011 | Hsiao et al. |
| 8,252,190 B2 | 8/2012 | Pentek et al. |
| 8,264,792 B2 | 9/2012 | Bai et al. |
| 8,318,031 B2 | 11/2012 | Pentek et al. |
| 8,347,488 B2 | 1/2013 | Hong et al. |
| 8,349,197 B2 | 1/2013 | Hong et al. |
| 8,441,757 B2 | 5/2013 | Chen et al. |
| 8,451,562 B2 | 5/2013 | Pentek et al. |
| 8,524,095 B2 | 9/2013 | Hong et al. |
| 8,537,494 B1 | 9/2013 | Pan et al. |
| 8,547,660 B2 | 10/2013 | Allen et al. |
| 8,724,258 B2 | 5/2014 | Zhang et al. |
| 8,797,684 B1 | 8/2014 | Tran et al. |
| 8,797,686 B1 * | 8/2014 | Bai ............... G11B 5/1278 360/119.03 |
| 9,082,423 B1 * | 7/2015 | Liu ....................... G11B 5/11 |
| 9,111,564 B1 | 8/2015 | Liu et al. |
| 9,245,562 B1 | 1/2016 | Liu et al. |
| 2008/0112088 A1 | 5/2008 | Hsiao et al. |
| 2012/0154951 A1 | 6/2012 | Hsiao et al. |

\* cited by examiner

*Primary Examiner* — Allen T Cao
(74) *Attorney, Agent, or Firm* — Convergent Law Group LLP

(57) ABSTRACT

A magnetic write apparatus has a media-facing surface (MFS), a pole, a trailing shield, coil(s) and a write gap between the pole and trailing shield. The pole includes leading and trailing surfaces, a main portion having a first bevel and an additional portion having a second bevel and adjoining the main portion. The first bevel adjoins the MFS and is at a nonzero, acute first bevel angle from a direction perpendicular to the MFS. The second bevel is recessed from the MFS by not more than eighty nanometers, oriented at a second bevel angle from the direction and offset from the first bevel by a taper having a taper angle that is greater than the first bevel angle. The additional portion is at least ten nanometers and not more than sixty nanometers thick as measured from the first bevel.

27 Claims, 11 Drawing Sheets

Prior Art
ABS View

MAGNETIC RECORDING APPARATUS HAVING A RECESSED ADDITIONAL POLE SEGMENT

BACKGROUND

FIGS. 1A and 1B depict (air-bearing surface) ABS and side views of a conventional magnetic recording apparatus 10. The magnetic recording apparatus 10 may be a perpendicular magnetic recording (PMR) apparatus or other magnetic write apparatus. The conventional magnetic recording apparatus 10 may be a part of a merged head including the write apparatus 10 and a read apparatus (not shown). Alternatively, the magnetic recording head may only include the write apparatus 10.

The write apparatus 10 includes a leading shield 12, a nonmagnetic gap layer 14, optional side shield(s) 15, a pole 20 and a trailing shield 30. The apparatus 10 may also include other components including but not limited to coils for energizing the pole 20. The pole 20 includes sidewalls 22 and 24 that form an angle φ0 with the down track direction at the ABS. The trailing surface (top) of the pole 20 is wider than the leading surface (bottom) of the pole 20. The top (trailing) surface of the pole 20 also has a bevel angle φ1 with the yoke direction. Thus, a write gap of constant width, d, is formed between the trailing shield 30 and the pole 20. At some distance in, however, the trailing shield 30 rapidly increases in distance from the pole 20.

Although the conventional magnetic recording apparatus 10 functions, there are drawbacks. In particular, the conventional magnetic write apparatus 10 may not perform sufficiently at higher areal recording densities. For example, at higher areal recording densities, the width in the cross-track direction and the height in the down-track direction for the pole 20 decrease. Consequently, the conventional pole may provide a reduced magnetic field at the ABS. In addition, the width of the gap 14 between the pole 20 and the side shields 15 decreases. Increased shunting of magnetic field from the conventional pole 20 by the side shields 15 may occur. As a result, the conventional write apparatus 10 may have reduced field strength (magnitude) available for writing to the media (not shown). This is undesirable. Accordingly, what is needed is a system and method for improving the performance of a magnetic recording write apparatus 10.

DETAILED DESCRIPTION OF THE PREFERRED EMBODIMENTS

Figure 1A:
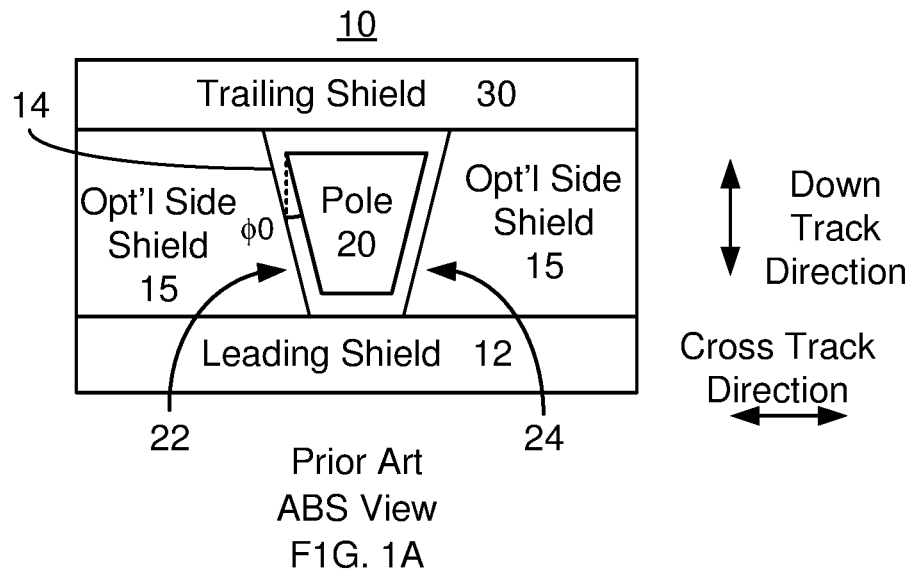
FIGS. 1A-1B depict ABS and side views of a conventional magnetic recording apparatus.
Figure 1B:
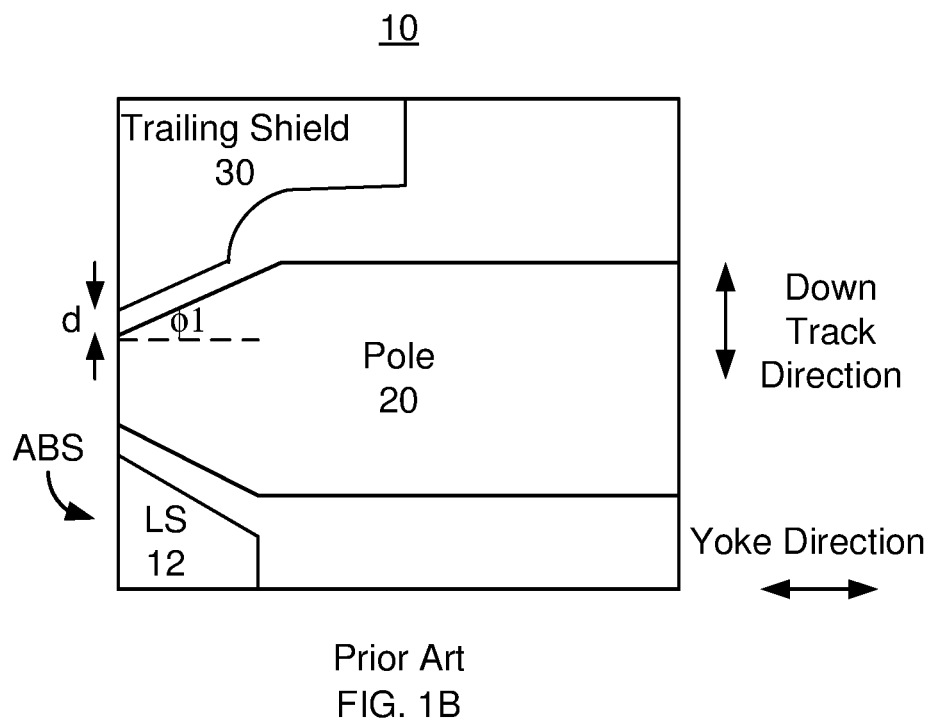

While the various embodiments disclosed are applicable to a variety of data storage devices such as magnetic recording disk drives, solid-state hybrid disk drives, networked storage systems etc., for the sake of illustration the description below uses disk drives as examples.

FIGS. 2A, 2B, 2C, 2D and 2E depict side, close-up apex, ABS, recessed and perspective views of an exemplary embodiment of a magnetic recording data storage device 100. In the embodiment shown, the data storage device 100 is a disk drive. For clarity, FIGS. 2A-2E are not to scale. For simplicity not all portions of the disk drive 100 and apparatus 120 are shown. In addition, although the disk drive 100 and write apparatus 120 are depicted in the context of particular components other and/or different components may be used. For example, circuitry used to drive and control various portions of the disk drive 100 is not shown. For simplicity, only single components are shown. However, multiples of each components and/or and their sub-components, might be used. The disk drive 100 may be a PMR disk drive. However, in other embodiments, the disk drive 100 may be configured for other types of magnetic recording.

The disk drive 100 includes media 102, a slider 110 and a write apparatus 120. The write apparatus 120 is fabricated on the slider 110 and includes a media-facing surface (MFS). In the embodiment shown, the MFS is an air-bearing surface (ABS) that is proximate to the media 102 during use. The slider 110 and thus the apparatus 120 are generally attached to a suspension (not shown). In general, the disk drive 100 includes a write apparatus 120 and a read apparatus (not shown). For clarity, only the write apparatus 120 is shown. The write apparatus 120 includes a write gap 122, coils 124, a pole 130, and trailing shield 140. The apparatus may also include a leading shield 123, optional side shields 124, and side/bottom gap 126. Multiple structures on which the leading shield 123 and pole 130 are fabricated may reside below the components shown. At least part of the side/bottom gap 126 is nonmagnetic and, in some embodiments, includes a seed layer for the pole. As discussed above, portions of the components 122, 123, 124, 126, 130 and 140 may include multiple layers. In other embodiments, different and/or additional components may be used in the write apparatus 120.

Figure 2A:
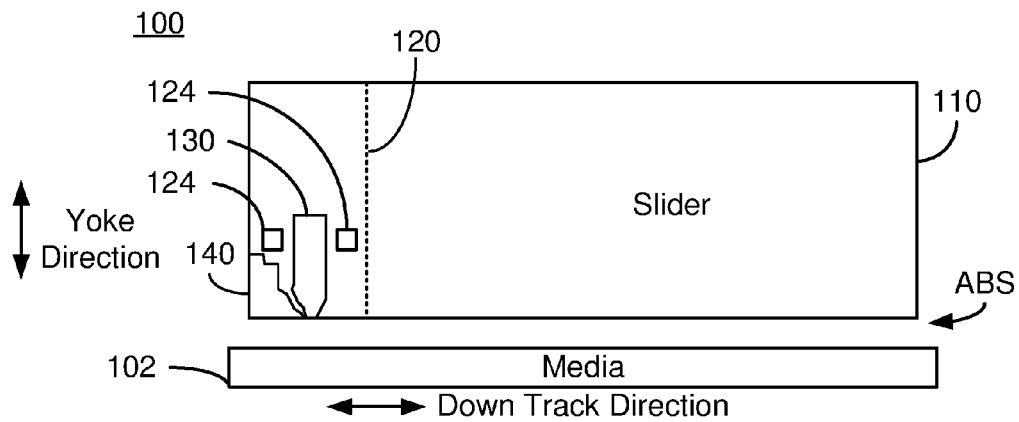
FIGS. 2A, 2B, 2C, 2D and 2E depict side, close-up apex, ABS, recessed and perspective views of an exemplary embodiment of a magnetic recording data storage device.
Figure 2B:
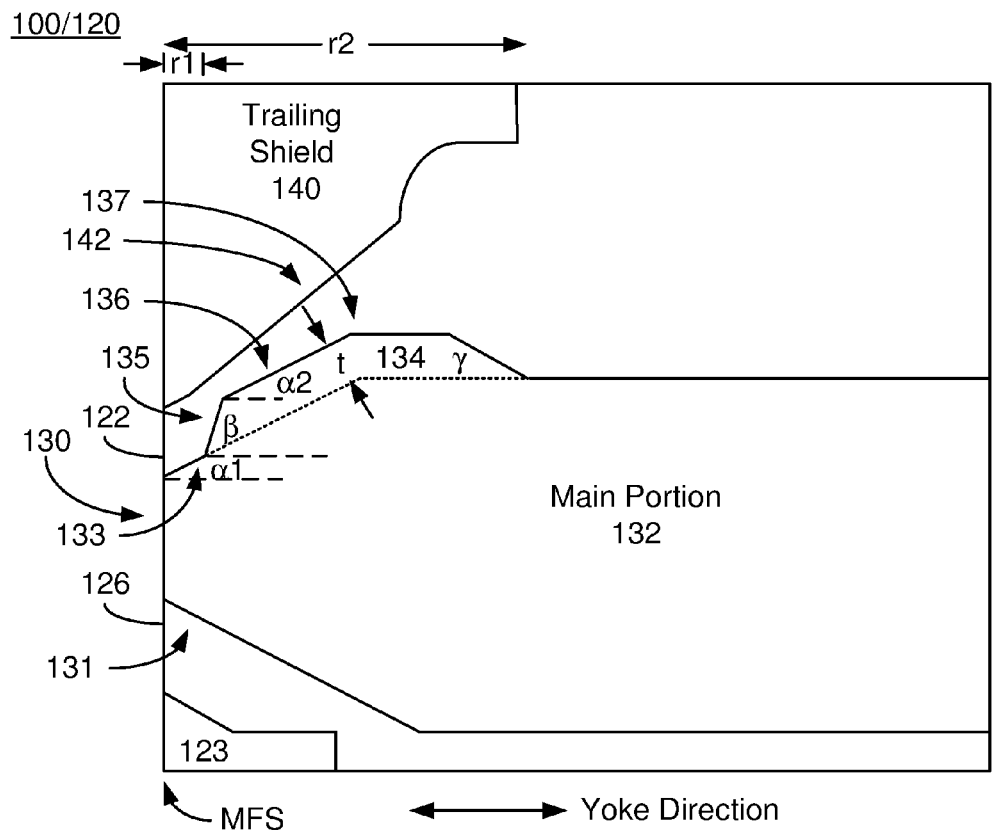
Figure 2C:
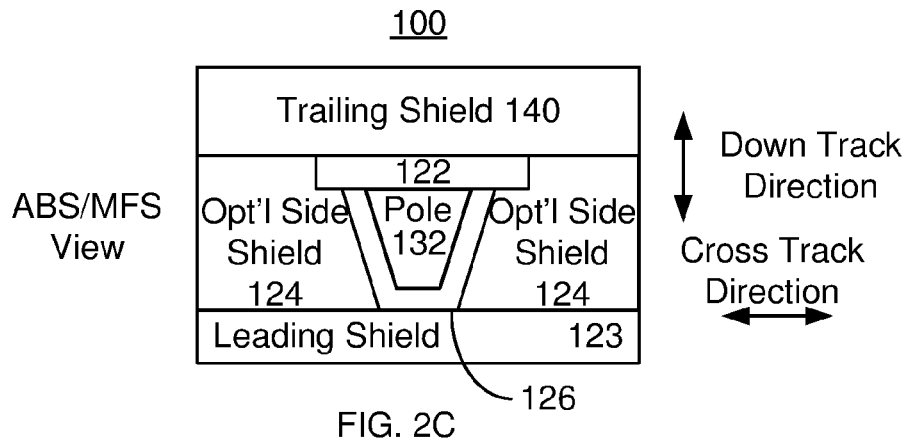
Figure 2D:
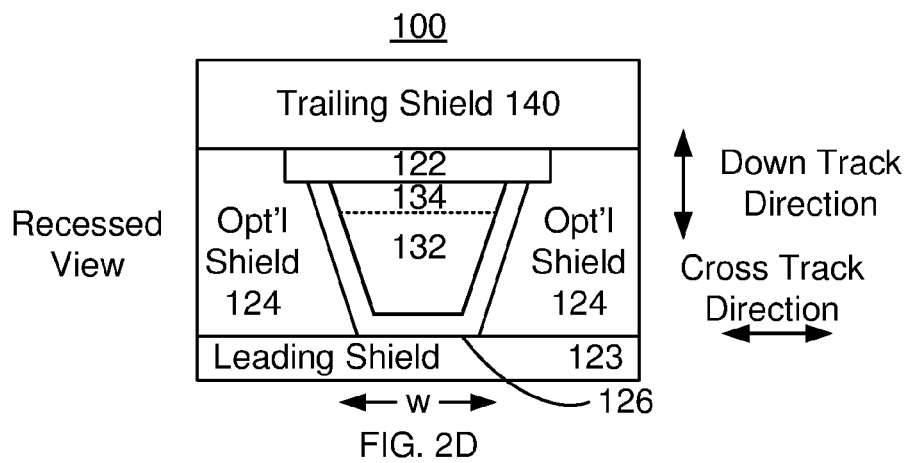

The coil(s) 124 are used to energize the pole 130. Two turns 124 are depicted in FIG. 2A. Another number of turns may, however, be used. Note that only a portion of the coil(s) 124 is shown in FIG. 2A. Additional turns and/or additional layers of coils may be used. If, for example, the coil(s) 124 form a spiral, or pancake, coil, then additional portions of the coil(s) 124 may be located further from the ABS. The coil(s) 124 may also be a helical coil.

Figure 2E:
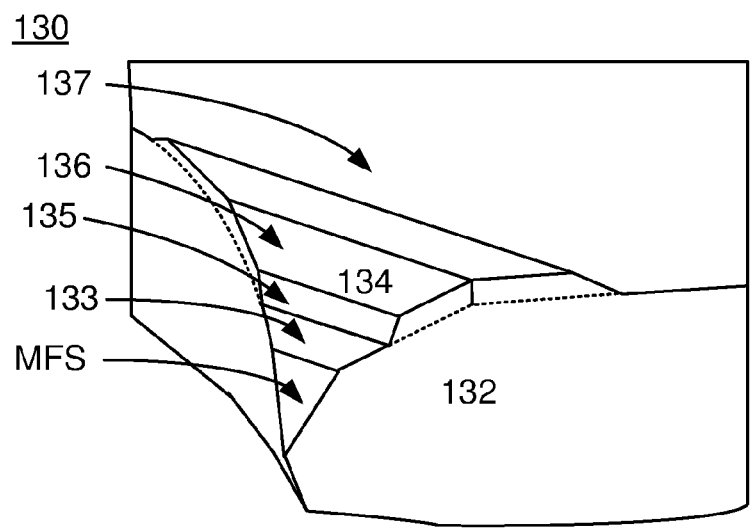

The pole 130 includes a leading surface 131 and a trailing surface 137. The leading surface 131 faces the leading shield 123, while the trailing surface 137 faces the trailing shield 140. The pole 130 includes a main portion 132 and an additional portion 134. Because they are both part of the pole 130, the main portion 132 and additional portion 134 of the pole 130 are shown in FIGS. 2B-2E as separated by dashed lines. A part of the main portion 132 occupies the MFS, while the additional portion 134 is recessed from the MFS. Thus, the main portion 132 is seen in the ABS/MFS view depicted in FIG. 2C. However, the additional portion 134 is not shown. In the recessed view of FIG. 2D, however, the main portion 132 and the additional portion 134 are both seen. The pole tip region of the pole 130 includes sidewalls in the cross-track direction. The sidewalls are generally configured such that the pole 130 has a bottom and a top wider than the bottom. In the MFS view of FIG. 2C, the pole 130 is shown as having a trapezoidal cross section. In FIG. 2E, however, the cross section of the pole 130 at the MFS is triangular. In general, the cross section at the MFS is either triangular or trapezoidal. Further from the MFS, however, the cross section is generally trapezoidal.

In the embodiment shown, both the leading surface 131 and the trailing surface 137 are beveled. Stated differently, the leading surface 131 and the trailing surface 137 each from a nonzero acute angle with the direction perpendicular to the MFS. The main portion 132 includes high saturation magnetization (at least 2.0 T) material(s). In some embodiments, magnetic material(s) having a saturation magnetization of at least 2.4 T are used for the main portion 132. The main portion 132 has a first bevel 133 with respect at first bevel angle, $\alpha 1$, with respect to a normal to the MFS. This first bevel 133 occurs at the MFS. Stated differently, the first bevel 133 adjoins the MFS. The first bevel angle is nonzero and acute. In some embodiments, the bevel angle is at least fifteen degrees and not more than forty degrees. The first bevel angle may be at least twenty degrees and not more than thirty-five degrees. In some such embodiments, the bevel angle is at least twenty-two degrees and not more than twenty-eight degrees. For example, the first bevel angle may be nominally twenty-five degrees.

The additional portion 134 adjoins the main portion 132 of the pole 130. In some embodiments, the additional portion 134 and the main portion 132 are formed of the same material. In other embodiments, the additional portion 134 and main portion 132 are formed of different materials. For example, the materials may have different moments, different magnetic stress properties and/or other different characteristics. However, both portions 132 and 134 include ferromagnetic materials. The additional portion 134 has a second bevel 136 oriented at a second bevel angle, $\alpha 2$, with respect to the normal to the MFS. In some embodiments, the first and second bevel angles are equal ($\alpha 2 = \alpha 1$). In other embodiments, the first and second bevel angles differ ($\alpha 2 \neq \alpha 1$). The second bevel 136 is recessed from the MFS by a recess distance, r1. Note, however, that the recess distance r1 is measured from the MFS to the start of the additional portion 134. The recess distance is nonzero and not more than eighty nanometers. The recess distance may be at least twenty nanometers. In some such embodiments, the recess distance is at least thirty nanometers and not more than fifty nanometers.

The second bevel 136 is offset from the first bevel 133 by a taper 135 having a taper angle, $\beta$. Thus, the second portion 134 includes both the taper 135 and the second bevel 136. The taper angle is greater than the first bevel angle ($\beta > \alpha 1$). The taper angle is also at least twenty degrees and not more than sixty degrees. The additional portion 134 has a thickness, t, of at least ten nanometers and not more than sixty nanometers as measured from the first bevel 133. In some such embodiments, the thickness is at least twenty nanometers and not more than forty nanometers. The first bevel 133, the second bevel 136 and the taper 135 form at least a portion of the trailing surface 137. Stated differently, the main portion 132 and the additional portion 134 form at least part of the trailing surface. In other embodiments, an auxiliary pole (not shown) may be included. The additional portion 134 also has a width, w, in the cross-track direction shown in FIG. 2D. As can be seen in FIG. 2E, in at least some embodiments, the width of the additional portion 134 increases with increasing distance from the MFS.

The additional portion 134 also extends a distance, r2, from the MFS. This distance may be at least one hundred nanometers and not more than three microns from the MFS. In some embodiments, the additional portion 134 extends at least two hundred nanometers from the MFS. Further, the additional portion 134 terminates at a back surface. This back surface forms an angle, $\gamma$, with the direction perpendicular to the MFS. The angle is within ninety degrees from the direction perpendicular to the MFS. For example, in some embodiments, the angle is at least twenty degrees and not more than forty-five degrees from the direction perpendicular to the MFS. In other embodiments, the back surface of the additional portion 134 is parallel to the MFS.

The trailing shield 140 has a pole-facing surface 142 that is opposite to the trailing surface 137 of the pole 130. The pole-facing surface 142 may have a variety of shapes. In general, the pole-facing surface 142 and trailing surface 137 are desired to be parallel near the MFS.

The magnetic data storage device 100 may exhibit improved performance. Because of the presence of the additional portion 134 of the pole 130, the pole 130 may have improved on track performance. For example, the magnitude of the write field provided by the pole 130 may increase. Other aspects of on track performance such as the reverse overwrite and writer signal to noise ratio may be improved. These benefits may be achieved without adversely affecting off-track performance. Because the additional portion 134 is recessed from the MFS, the wide area track erasure and adjacent track interference may remain substantially unaffected. Thus, performance of the write apparatus 120 and data storage device 100 may be improved.

Figure 3:
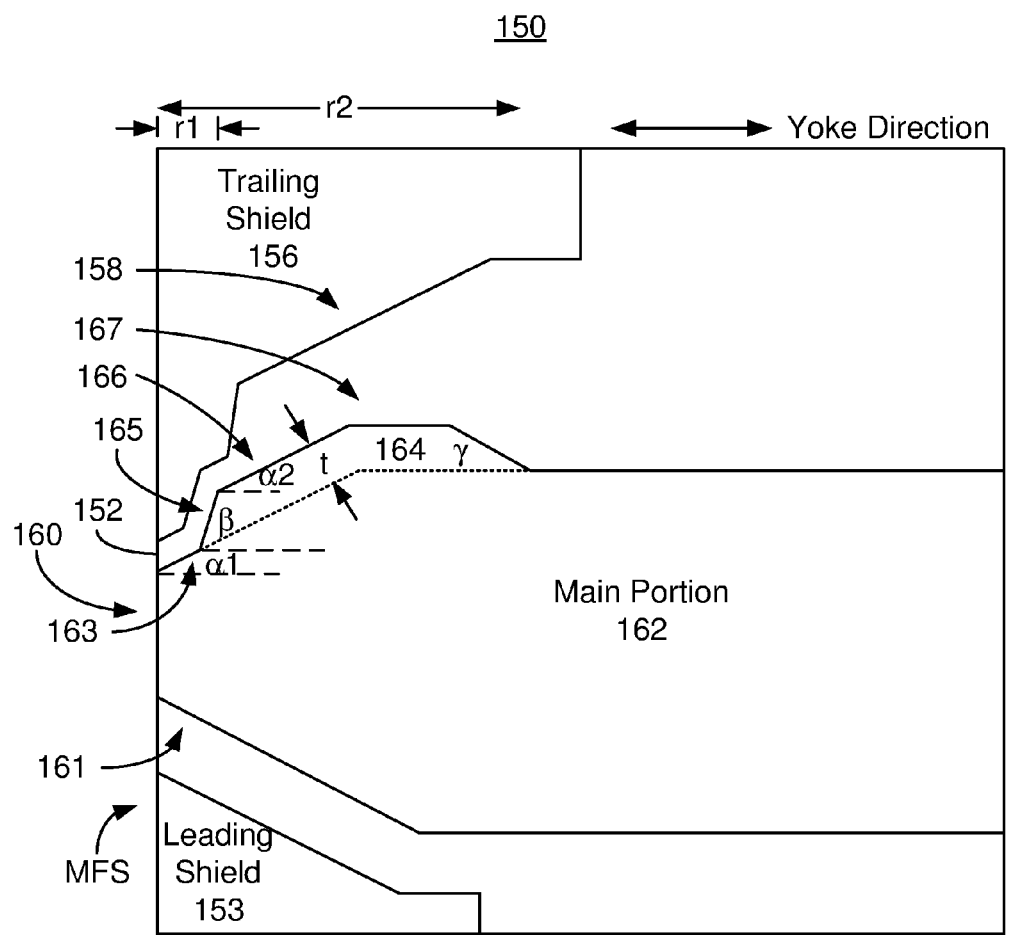
FIG. 3 depicts an apex view of another exemplary embodiment of a magnetic recording apparatus.

FIG. 3 depicts a side view of another exemplary embodiment of a magnetic recording apparatus 150 that may be used in a data storage device such as the disk drive 100. For clarity, FIG. 3 is not to scale. For simplicity not all portions of the write apparatus 150 are shown. The magnetic write apparatus 150 is analogous to the write apparatus 120. Thus, analogous components have similar labels. Further, as the MFS/ABS view, and recessed view of the write apparatus 150 is analogous to that of the apparatus 120, only an apex view is shown. Thus, the write apparatus 150 includes an optional leading shield 153, pole 160, write gap 152 and trailing shield 156 that are analogous to the leading shield 123, the pole 130, write gap 122 and the trailing shield 140, respectively. The pole 160 has a leading surface 161 and a trailing surface 167 that are analogous to the leading surface 131 and trailing surface 137, respectively, of the pole 130. The pole 160 also includes a main portion 162 and additional portion 164 that are analogous to the main portion 132 and additional portion 134, respectively. Thus, the location, configuration and material(s) used for these features depicted in FIG. 3 are analogous to those features depicted in FIGS. 2A-2E.

The main portion 162 includes first bevel 163 at first bevel angle $\alpha 1$ from a direction perpendicular to the MFS. Thus, the first bevel 163 and first bevel angle of FIG. 3 are analogous to the first bevel 133 and first bevel angle of FIGS. 2A-2E. The additional portion 164 includes a second bevel 166 at a second bevel angle, $\alpha 2$, that are analogous to the second bevel 136 and second bevel angle of the additional portion 134. In addition, the second bevel 166 is separated from the first bevel 163 by a taper 165 having taper angle $\beta$. The taper 165 and taper angle are analogous to the taper 133 and taper angle of the additional portion 134. The additional portion 164 is recessed by a distance r1 from the MFS, extends a distance r2 from the MFS and has a thickness t as measured from the first bevel 163 that are analogous to those for the additional portion 134. The additional portion 164 also has a back surface at an angle, γ, from the direction normal to the MFS that are analogous to the back surface and angle γ of the additional portion 134. Thus, the location, configuration and material(s) used for these portions of the pole 160 are analogous to features depicted in FIGS. 2A-2E.

In the embodiment shown in FIG. 3, the trailing shield 156 has a trailing surface 158 that is analogous to the trailing surface 142 of the trailing shield 140. The trailing surface 158 has multiple portions. The trailing surface 158 forms a first trailing shield angle with the direction normal to the MFS. In some embodiments, this first trailing shield angle is substantially equal to the first bevel angle. Thus, this first portion of the pole-facing surface 158 is substantially parallel to the first bevel 163. The pole-facing surface 158 of the trailing shield 156 also has a second portion opposite to the taper 165 and recessed from the MFS. This second portion is at a second trailing shield angle from a direction perpendicular to the MFS. In some embodiments, this second trailing shield angle is substantially equal to the taper angle, β. Thus, the second portion of the pole-facing surface 158 is substantially parallel to the taper 165. The pole-facing surface 158 has a third portion. The second portion is between the first and third portions of the pole-facing surface 158. The third portion is opposite to at least part of the second bevel 166. The third portion tapers away from the pole 130 and is at a third trailing shield angle from normal to the MFS. In some embodiments, the third trailing shield angle is substantially equal to the second bevel angle, α2. Thus, the third portion of the pole-facing surface 158 may be parallel to the second bevel. In the embodiment shown, the trailing shield 156 tapers way from the pole 162. In other embodiments, other shapes are possible.

The magnetic write apparatus 150 may share the benefits of the apparatus 120 and disk drive 100. As a result, performance of the write apparatus 150 may be improved. Because of the additional portion 164 of the pole 160, the pole 160 may have improved on track performance. For example, the magnitude of the write field provided by the pole 160 may be larger, reverse overwrite enhanced and writer signal to noise ratio may be improved. These benefits may be achieved without adversely affecting off-track performance such as wide area track erasure and adjacent track interference. Thus, performance of the write apparatus 150 and data storage device 100 may be improved.

Figure 4:
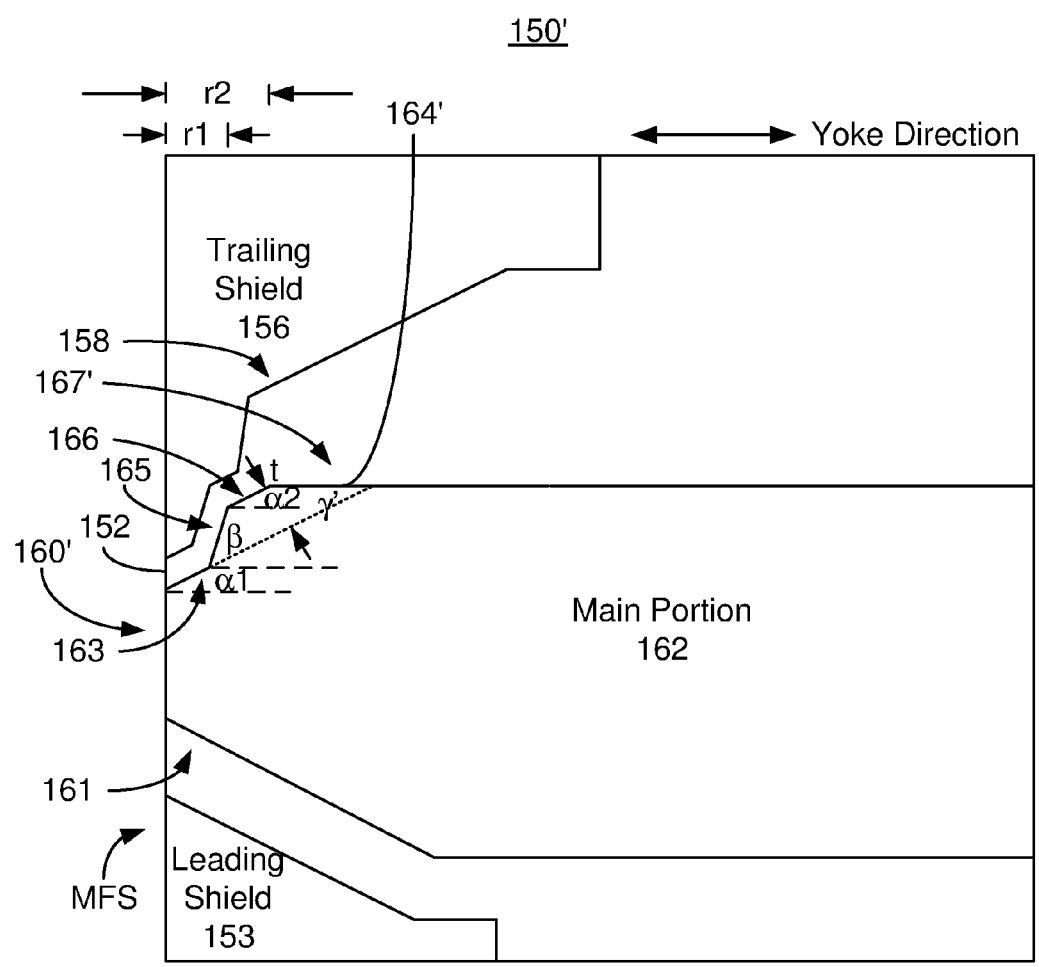
FIG. 4 depicts an apex view of another exemplary embodiment of a magnetic recording apparatus.

FIG. 4 depicts a side view of another exemplary embodiment of a magnetic recording apparatus 150' that may be used in a data storage device such as the disk drive 100. For clarity, FIG. 4 is not to scale. For simplicity not all portions of the write apparatus 150' are shown. The magnetic write apparatus 150' is analogous to the write apparatus(es) 120 and/or 150. Thus, analogous components have similar labels. Further, as the MFS/ABS view, and recessed view of the write apparatus 150' is analogous to that of the apparatus 120, only an apex view is shown. Thus, the write apparatus 150' includes an optional leading shield 153, pole 160', write gap 152 and trailing shield 156 that are analogous to the leading shield 123 and 153, the pole 130 and 160, write gap 122 and 152, and the trailing shield 140 and 156, respectively. The pole 160' has a leading surface 161 and a trailing surface 167' that are analogous to the leading surface 131 and 161 and trailing surface 137 and 167, respectively, of the pole(s) 130 and 160. The pole 160' also includes a main portion 162 and additional portion 164' that are analogous to the main portion 132/162 and additional portion 134/164, respectively. Thus, the location, configuration and material(s) used for these features depicted in FIG. 4 are analogous to those features depicted in FIGS. 2A-2E and 3.

The main portion 162 includes first bevel 163 at first bevel angle α1 from a direction perpendicular to the MFS. Thus, the first bevel 163 and first bevel angle of FIG. 4 are analogous to the first bevel 133/163 and first bevel angle of FIGS. 2A-2E and 3. The additional portion 164' includes a second bevel 166 at a second bevel angle, α2, that are analogous to the second bevel 136/166 and second bevel angle of the additional portion 134/164. In addition, the second bevel 166 is separated from the first bevel 163 by a taper 165 having taper angle β. The taper 165 and taper angle are analogous to the taper 133/165 and taper angle of the additional portion 134/164. The additional portion 164' is recessed by a distance r1 from the MFS, extends a distance r2 from the MFS and has a thickness t as measured from the first bevel 163 that are analogous to those for the additional portion 134/164. The additional portion 164' also has a back surface at an angle, γ', from the direction normal to the MFS that are analogous to the back surface and angle γ of the additional portion 134. In this case, γ' is zero. Thus, the location, configuration and material(s) used for these portions of the pole 160' are analogous to those features depicted in FIGS. 2A-2E and 3.

The magnetic write apparatus 150' may share the benefits of the apparatus 120/150 and disk drive 100. As a result, performance of the write apparatus 150 may be improved. Because of the additional portion 164' of the pole 160, the pole 160 may have improved on track performance. For example, the magnitude of the write field provided by the pole 160' may be larger, reverse overwrite enhanced and writer signal to noise ratio may be improved. These benefits may be achieved without adversely affecting off-track performance such as wide area track erasure and adjacent track interference. Thus, performance of the write apparatus 150 and data storage device 100 may be improved.

Figure 5:
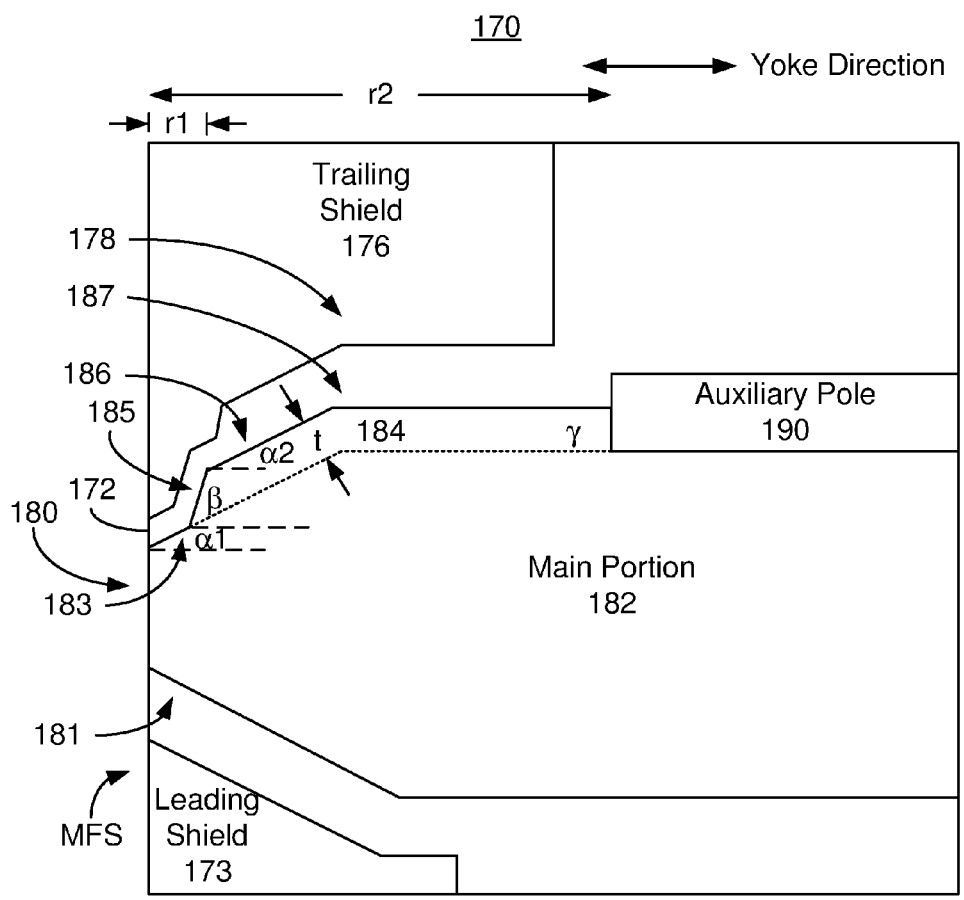
FIG. 5 depicts an apex view of another exemplary embodiment of a magnetic recording apparatus.

FIG. 5 depicts a side view of another exemplary embodiment of a magnetic recording apparatus 170 that may be used in a data storage device such as the disk drive 100. For clarity, FIG. 5 is not to scale. For simplicity not all portions of the write apparatus 170 are shown. The magnetic write apparatus 170 is analogous to the write apparatus(es) 120, 150 and/or 150'. Thus, analogous components have similar labels. Further, as the MFS/ABS view, and recessed view of the write apparatus 170 is analogous to that of the apparatus 120, only an apex view is shown. Thus, the write apparatus 170 includes an optional leading shield 173, pole 180, write gap 172 and trailing shield 176 that are analogous to the leading shield 123 and 153, the pole 130, 160 and 160', write gap 122 and 152, and the trailing shield 140 and 156, respectively. The pole 180 has a leading surface 181 and a trailing surface 187 that are analogous to the leading surface 131 and 161 and trailing surface 137, 167 and 167', respectively, of the pole(s) 130, 160 and 160'. The pole 180 also includes a main portion 182 and additional portion 184 that are analogous to the main portion 132/162 and additional portion 134/164/164', respectively. The trialing shield 176 has a pole-facing surface 178 analogous to the pole-facing surface 142/158. In other embodiments, the pole-facing surface 178 may have a different shape. Thus, the location, configuration and material(s) used for these features depicted in FIG. 5 are analogous to those features depicted in FIGS. 2A-2E and 3-4.

The main portion 182 includes first bevel 183 at first bevel angle α1 from a direction perpendicular to the MFS. Thus, the first bevel 183 and first bevel angle of FIG. 5 are analogous to the first bevel 133/163 and first bevel angle of FIGS. 2A-2E and 3-4. The additional portion 184 includes a second bevel 186 at a second bevel angle, α2, that are analogous to the second bevel 136/166 and second bevel angle of the additional portion 134/164/164'. In addition, the second bevel 186 is separated from the first bevel 183 by a taper 185 having taper angle β. The taper 185 and taper angle are analogous to the taper 133/165 and taper angle of the additional portion 134/164/164'. The additional portion 184 is recessed by a distance r1 from the MFS, extends a distance r2 from the MFS and has a thickness t as measured from the first bevel 163 that are analogous to those for the additional portion 134/164/164'. The additional portion 184 also has a back surface at an angle, γ, from the direction normal to the MFS that are analogous to the back surface and angle γ of the additional portion 134. In this case, γ is ninety degrees. Thus, the location, configuration and material(s) used for these portions of the pole 180 are analogous to those features depicted in FIGS. 2A-2E and 3-4.

The write apparatus 170 also includes an auxiliary pole 190. In the embodiment shown, only a trailing auxiliary pole 190 is shown. In other embodiments, the write apparatus 170 may include a leading auxiliary pole in addition to or in lieu of the auxiliary pole 190. Such a leading auxiliary pole would be recessed from the MFS further than the leading shield 173 and adjoin the leading surface 181 of the pole 180. In the embodiment shown, the additional portion 184 of the pole 180 extends from the recess distance r1 to the auxiliary pole 190. In other embodiments, the additional portion 184 of the pole 180 may extend a different distance from the MFS.

The magnetic write apparatus 180 may share the benefits of the apparatus 120/150/150' and disk drive 100. As a result, performance of the write apparatus 180 may be improved. Because of the additional portion 184 of the pole 180, the pole 180 may have improved on track performance. For example, the magnitude of the write field provided by the pole 180 may be larger, reverse overwrite enhanced and writer signal to noise ratio may be improved. The additional portion 184 of the pole 180 also extends further, to the auxiliary pole 190. This configuration may, therefore, reduce flux choking, which is generally desirable. These benefits may be achieved without adversely affecting off-track performance such as wide area track erasure and adjacent track interference. Thus, performance of the write apparatus 170 and data storage device 100 may be improved.

Figure 6:
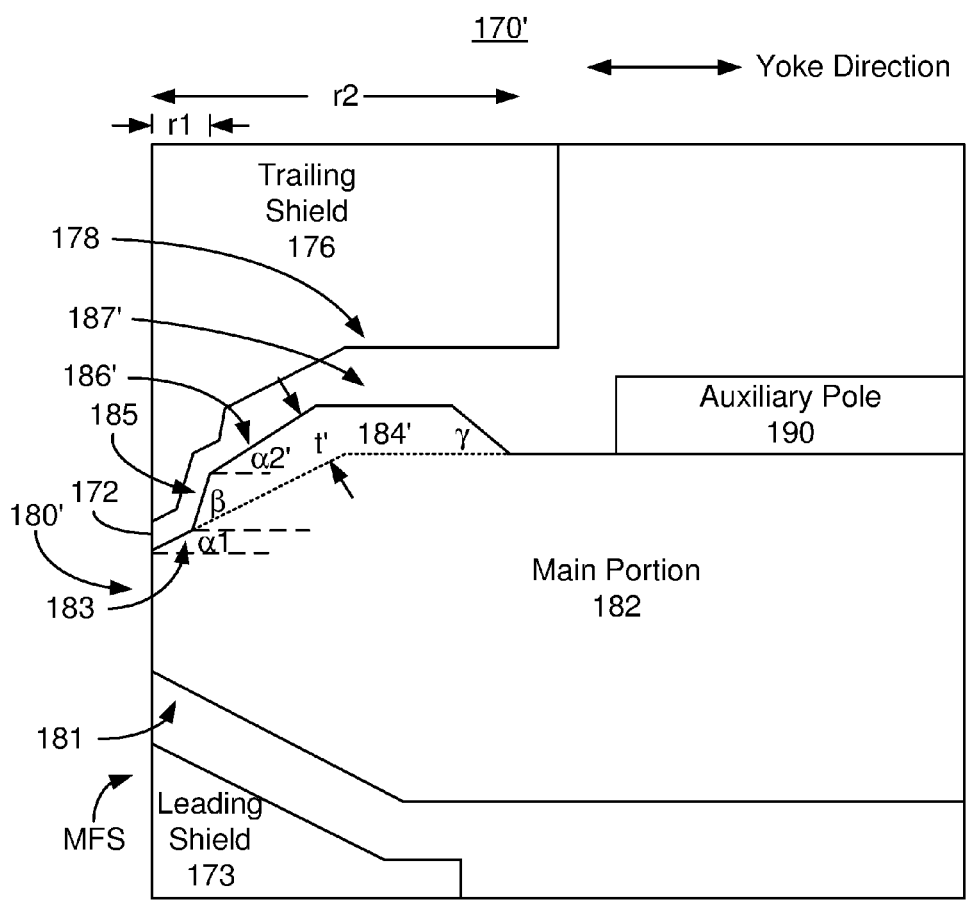
FIG. 6 depicts an apex view of another exemplary embodiment of a magnetic recording apparatus.

FIG. 6 depicts a side view of another exemplary embodiment of a magnetic recording apparatus 170' that may be used in a data storage device such as the disk drive 100. For clarity, FIG. 6 is not to scale. For simplicity not all portions of the write apparatus 170' are shown. The magnetic write apparatus 170' is analogous to the write apparatus(es) 120, 150, 150' and/or 170. Thus, analogous components have similar labels. Further, as the MFS/ABS view, and recessed view of the write apparatus 170' is analogous to that of the apparatus 120, only an apex view is shown. Thus, the write apparatus 170' includes an optional leading shield 173, pole 180', write gap 172 and trailing shield 176 that are analogous to the leading shield 123/153/173, the pole 130/160/160'/180, write gap 122/152/172, and the trailing shield 140/156/176, respectively. The pole 180' has a leading surface 181 and a trailing surface 187' that are analogous to the leading surface 131/161/181 and trailing surface 137/167/167'/187, respectively, of the pole(s) 130/160/160'/180. The pole 180' also includes a main portion 182 and additional portion 184' that are analogous to the main portion 132/162/182 and additional portion 134/164/164'/184, respectively. The trialing shield 176 has a pole-facing surface 178 analogous to the pole-facing surface 142/158/178. In other embodiments, the pole-facing surface 178 may have a different shape. Thus, the location, configuration and material(s) used for these features depicted in FIG. 5 are analogous to those features depicted in FIGS. 2A-2E and 3-4.

The main portion 182 includes first bevel 183 at first bevel angle α1 from a direction perpendicular to the MFS. Thus, the first bevel 183 and first bevel angle of FIG. 6 are analogous to the first bevel 133/163/183 and first bevel angle of FIGS. 2A-2E and 3-5. The additional portion 184' includes a second bevel 186' at a second bevel angle, α2', that are analogous to the second bevel 136/166/186 and second bevel angle of the additional portion 134/164/164'/186. However, in the embodiment shown in FIG. 6, the second bevel angle α2' is larger than α1. Thus, the second bevel 186' is not parallel to the first bevel 183. In addition, the third trailing shield angles for the pole-facing surface 178 differs from the second bevel angle. Thus, the pole-facing surface 178 opposite to the second bevel 186' is not parallel to the second bevel 186'. The second bevel 186' is separated from the first bevel 183 by a taper 185 having taper angle β. The taper 185 and taper angle are analogous to the taper 133/165/185 and taper angle of the additional portion 134/164/164'/184. The additional portion 184' is recessed by a distance r1 from the MFS, extends a distance r2 from the MFS and has a thickness t as measured from the first bevel 163 that are analogous to those for the additional portion 134/164/164'/184. The additional portion 184' also has a back surface at an angle, γ, from the direction normal to the MFS that are analogous to the back surface and angle γ of the additional portion 184. In this case, γ is shown as acute. However, other sizes up to ninety degrees from the direction perpendicular to the MFS are possible. Thus, the location, configuration and material(s) used for these portions of the pole 180' are analogous to those features depicted in FIGS. 2A-2E and 3-5.

The write apparatus 170' also includes an auxiliary pole 190 analogous to the auxiliary pole 190 depicted in FIG. 5. In the embodiment shown, only a trailing auxiliary pole 190 is shown. In other embodiments, the write apparatus 170 may include a leading auxiliary pole in addition to or in lieu of the auxiliary pole 190. Such a leading auxiliary pole would be recessed from the MFS further than the leading shield 173 and adjoin the leading surface 181 of the pole 180'. In the embodiment shown, the additional portion 184' of the pole 180' extends from the recess distance r1 to a distance r2 that is less than the amount the auxiliary pole 190 is recessed. In this embodiment, therefore, the additional portion 184' does not extend to the auxiliary pole 190.

The magnetic write apparatus 180' may share the benefits of the apparatus 120/150/150'/180 and disk drive 100. As a result, performance of the write apparatus 170' may be improved. Because of the additional portion 184' of the pole 180', the pole 180' may have improved on track performance. For example, the magnitude of the write field provide by the pole 180' may be larger, reverse overwrite enhanced and writer signal to noise ratio may be improved. These benefits may be achieved without adversely affecting off-track performance such as wide area track erasure and adjacent track interference. Thus, performance of the write apparatus 180' and data storage device 100 may be improved.

Various features of the write apparatus 120, 150, 150', 170 and 170' are highlighted in the description herein. These features may be combined in manners not explicitly disclosed and which are not inconsistent with the method and apparatus described herein. Similarly, the trailing shield, write gap and pole are described in the context of various distances, angle and materials. In other embodiments, other distances, angles and/or materials might be used.

Figure 7:
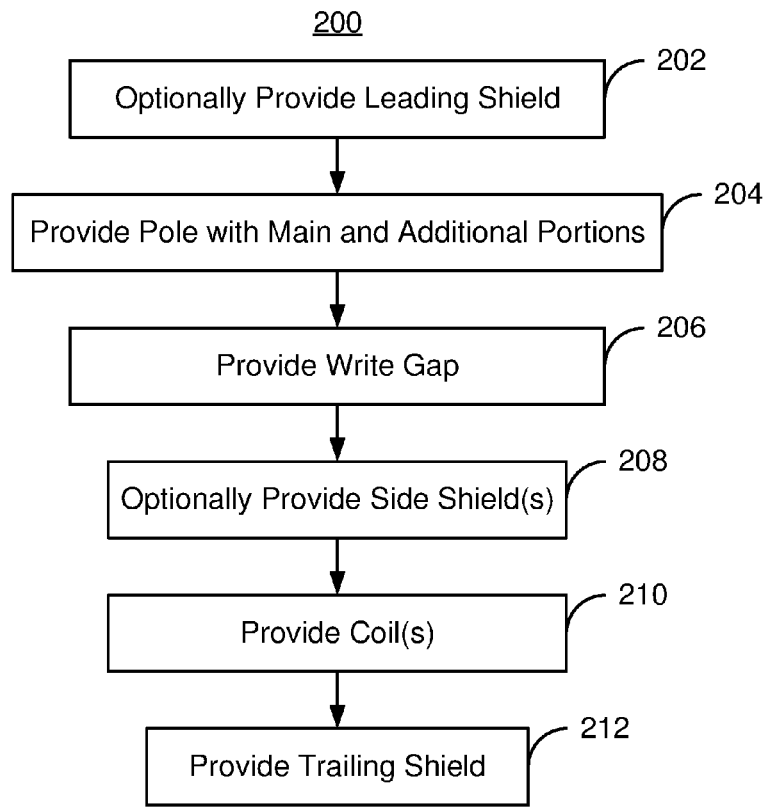
FIG. 7 is a flow chart depicting an exemplary embodiment of a method for providing magnetic recording apparatus.

FIG. 7 depicts an exemplary embodiment of a method 200 for providing a magnetic recording apparatus 120, 150, 150', 170 and 170'. For simplicity, some steps may be omitted, interleaved, combined and/or include substeps. FIGS. 8-13 depict apex views of another exemplary embodiment of a magnetic recording apparatus 300 during fabrication. FIGS. 8-13 are not to scale. The method 200 is also described in the context of providing a magnetic recording apparatus 300 and apparatus 120 depicted in FIGS. 8-13. The method 200 may also be used to fabricate other magnetic recording apparatuses including but not limited to any combination of 120, 150 150', 170 and/or 170'. The method 200 may be used to fabricate multiple magnetic recording heads at substantially the same time. The method 200 is also described in the context of particular layers. A particular layer may include multiple materials and/or multiple sub-layers. The method 200 also may start after formation of other portions of the magnetic recording head. For example, the method 200 may start after a read apparatus, return pole/leading shield and/or other structure have been fabricated.

Figure 8:
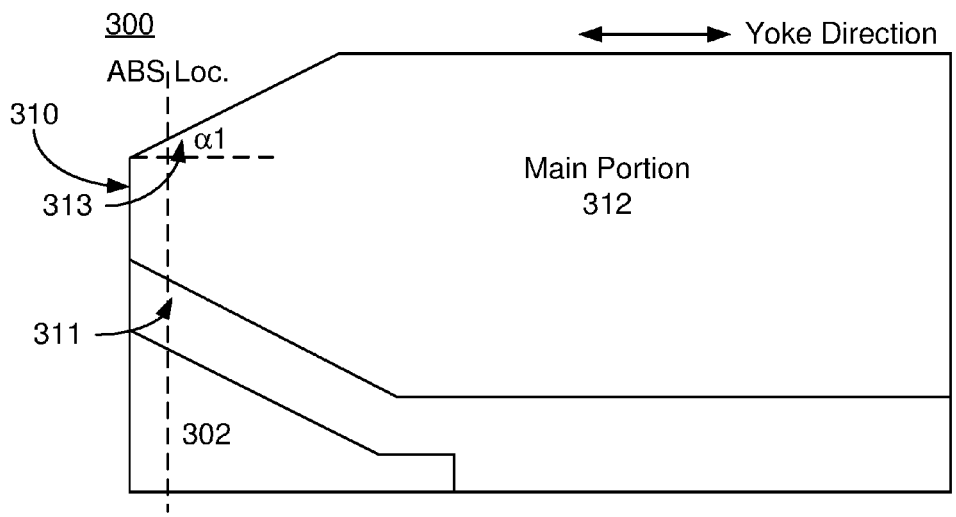
FIGS. 8-13 depict apex views of another exemplary embodiment of a magnetic recording apparatus during fabrication.

Referring to 7-13, a leading shield is optionally provided, via step 202. The pole having main and additional portions is provided, via step 204. Step 204 typically includes multiple steps. For example, a trench having the desired location and profile of at least the main portion of the pole is formed in a nonmagnetic material and, in some embodiments, the leading shield material(s). For example, a mask may be formed on the layer and an etch performed. The trench may be filled with ferromagnetic material(s) for the main portion of the pole. For example, a nonmagnetic gap layer such as Ru may be deposited and a plating step performed. A planarization such as a chemical mechanical planarization (CMP) may also be performed. The first bevel may also be formed in the main portion of the pole. For example, a portion of magnetic materials recessed from the location of the MFS may be masked and an ion mill or other directional removal step performed. In some embodiments, a carbon hard mask may be used. FIG. 8 depicts the write apparatus 300 after a portion of step 204 has been performed. Thus, the leading shield 302 is shown. The pole 310 is being formed. Thus, a main portion 312 having a beveled leading surface 311 has been formed. The main portion 312 may be formed of high moment (e.g. 2.4 T saturation magnetization) material(s). The first bevel 313 has also been formed. In FIGS. 8-13, the ABS location is also shown. The ABS location is the surface at which the MFS/ABS resides after lapping.

Figure 9:
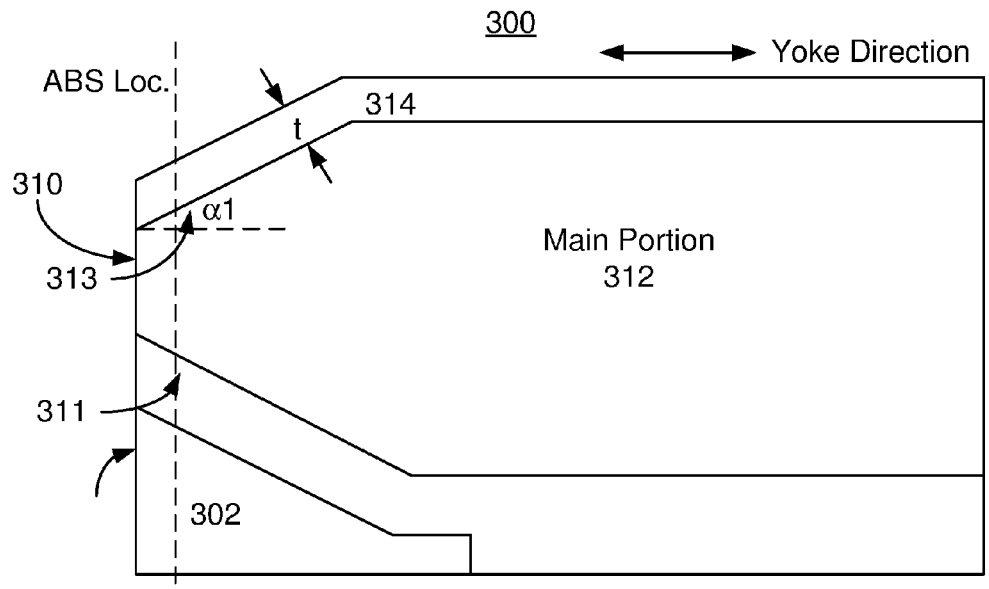
Figure 10:
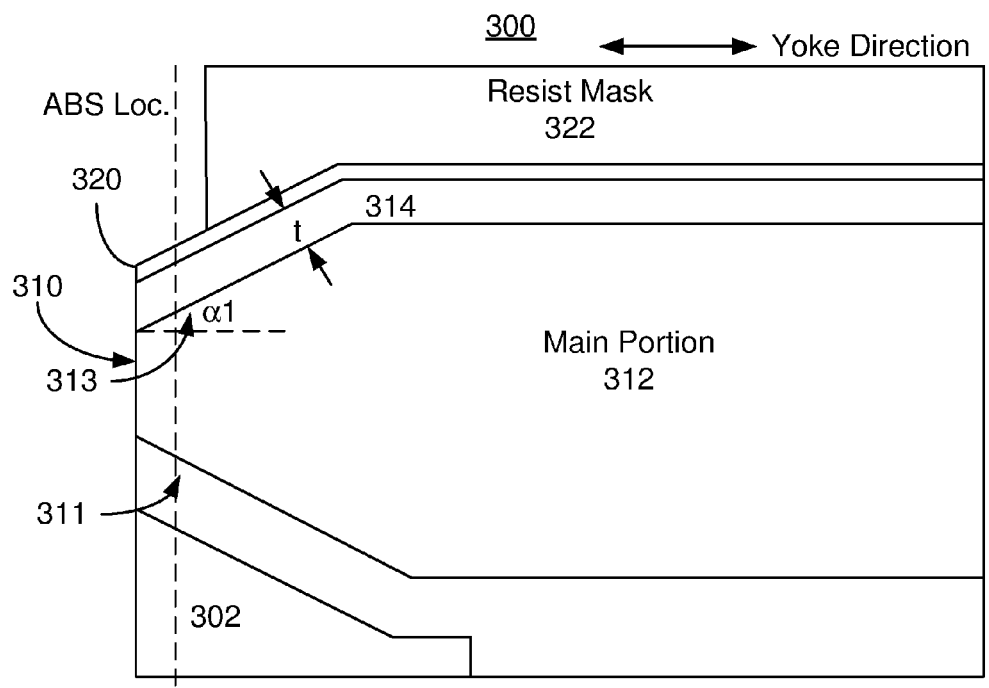
Figure 11:
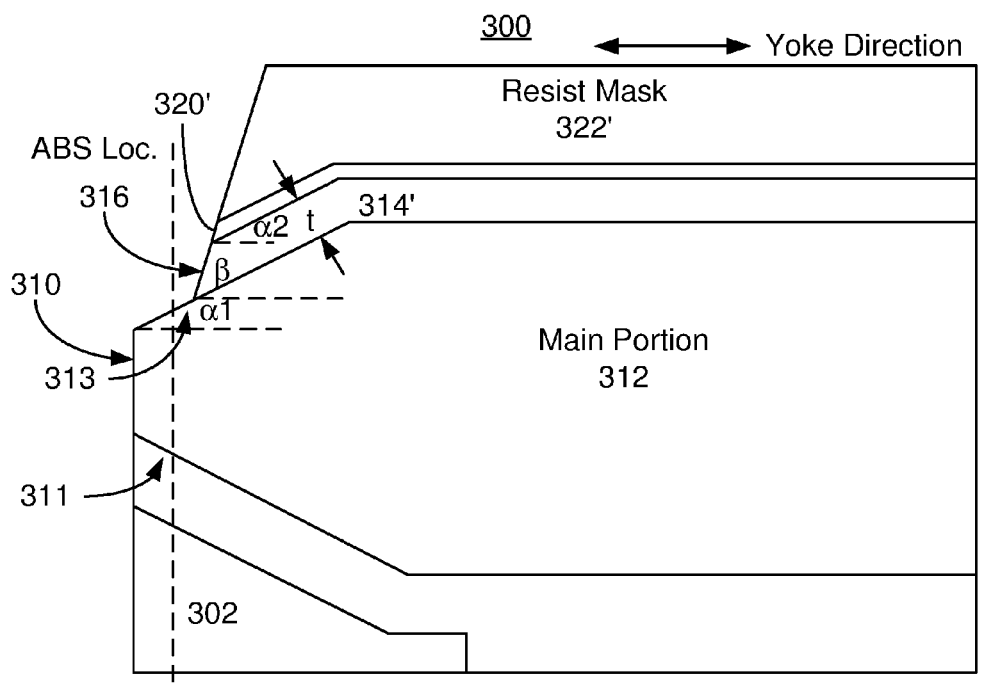
Figure 12:
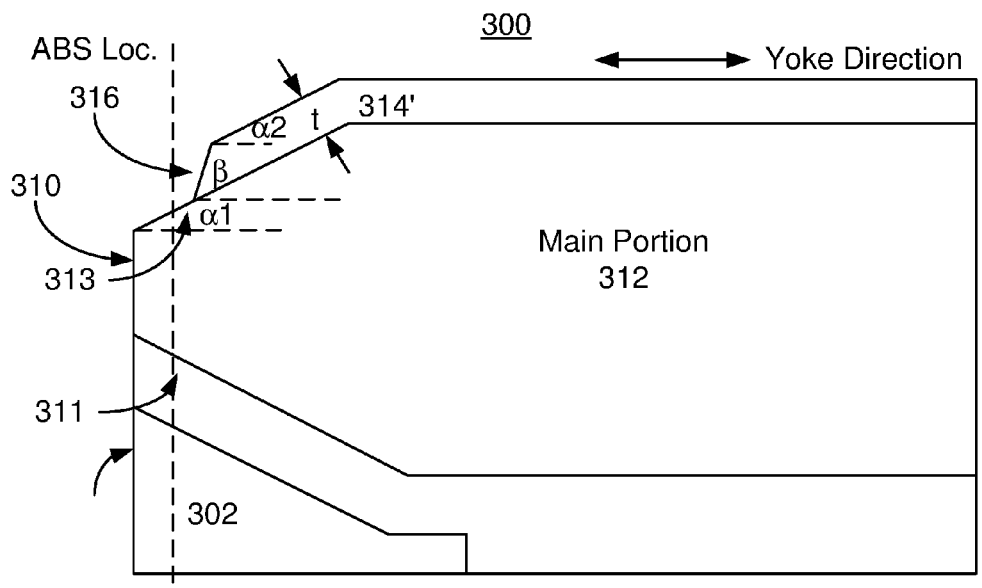
Figure 13:
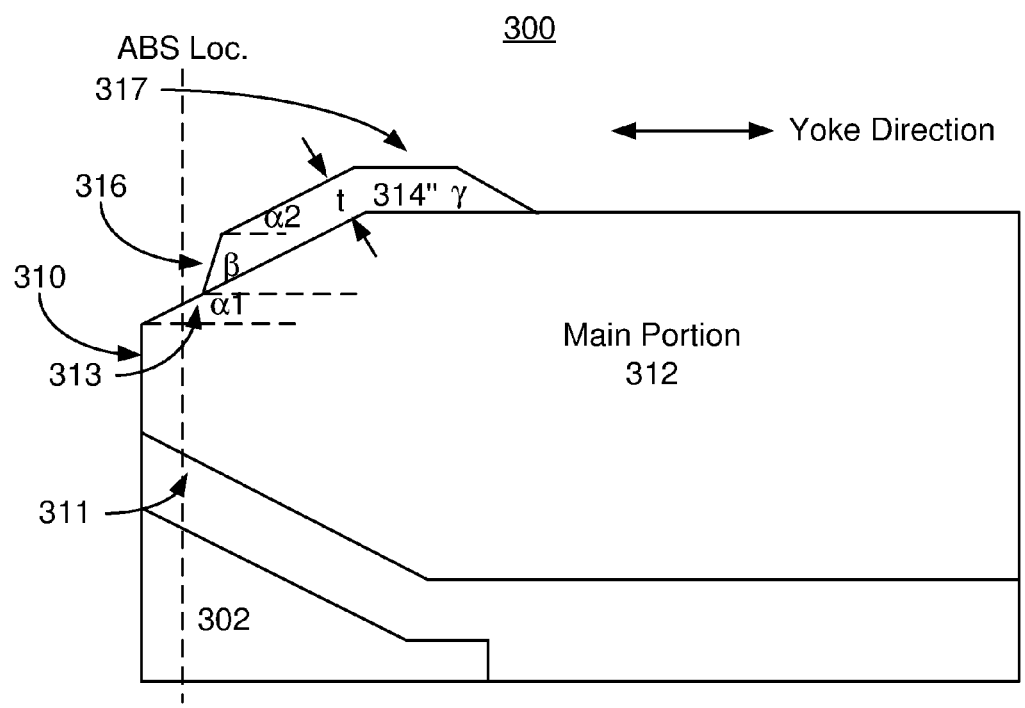

In order to form the additional portion of the pole 310, step 204 may also include depositing another layer of magnetic material(s) for the additional portion of the pole. Alternatively, the top surface of the main portion 312 may be further etched to provide the desired shape of the pole. FIG. 9 depicts the write apparatus 300 after the deposition step for the additional portion. The layer 314 is to form the additional portion and has the desired thickness, t. For example, a layer of high moment material, such as CoFe having a saturation magnetization of 2.4 T may be used. In addition, a Ta/Ru bilayer may be deposited on the CoFe as part of the layer 314. However, in other embodiments, other material(s)) having different characteristics may be used. The additional portion is desired to be further shaped. For example, the taper is to be formed. Thus, a mask recessed from the ABS location is formed as part of step 204. FIG. 10 depicts the write apparatus 300 after the mask has been formed. The mask includes a hard mask layer 320 and a resist mask 322. In some embodiments, the hard mask layer 320 is a carbon hard mask. A removal step that removes part of the layer 314 is carried out. For example, an ion mill may be performed. FIG. 11 depicts the write apparatus 300 after this removal step. Thus, the ion mill has formed the taper 316 in the layer 314'. A portion of the hard mask layer 320' and mask 322' remain. These mask layers may then be removed as part of step 204. FIG. 12 depicts the write apparatus 300 after removal of the mask. The additional portion is formed from the layer 314'. In some embodiments, the pole 310 of FIG. 12 is completed. In other embodiments, the additional portion is desired to be further shaped. For example, a portion of the layer 314' may be removed to form the back surface of the layer 314. FIG. 13 depicts the write apparatus 300 after a back surface at angle γ for the additional portion 314" has been formed. Although shown as acute, the angle γ may be up to ninety degrees. Thus, the main portion 312 and the additional portion 314" has been formed. In some embodiments, an auxiliary pole may be formed behind the additional portion 314".

The write gap is provided, via step 206. Step 206 includes depositing a nonmagnetic material. One or more layers may be deposited in step 206. The material may be conformally deposited. In addition, portions of the write gap may be removed to provide varying thicknesses of the gap.

One or more side shields may optionally be formed, via step 208. In some embodiments, step 208 includes removing a portion of the nonmagnetic layer adjacent to the pole 310 around the ABS location. This region is then refilled with a magnetic material such as NiFe.

The coil(s) are provided, via step 210. Portions of step 210 may thus be interleaved with the remaining steps of the method 200. For example, portions of the coil may be provided before the formation of the pole 310. However, other portions of the coil may be provided after some or all of the pole 310 has been formed. Step 210 may also include depositing and patterning the material(s) used for the coil(s). Step 210 may include forming one or more helical coils or one or more pancake/spiral coil. In such embodiments, a spiral coil may include other turns far from the ABS.

The trailing shield may be provided, via step 212. Step 212 may be performed such that multiple trailing shield angles as described above.

Using the method 300, the magnetic write apparatus 300, the magnetic apparatuses 120, 150, 150', 170 and/or 170' and the disk drive 100 may be provided. Thus, the benefits of the magnetic apparatuses 120, 150, 150', 170, 170' and/or 300 and the disk drive 100 may be achieved.

What is claimed is:

1. A magnetic write apparatus having a media-facing surface (MFS) comprising:

a pole including a leading surface, a trailing surface opposite to the leading surface, a main portion having a first bevel and an additional portion having a second bevel, the additional portion adjoining the main portion, the first bevel adjoining the MFS and being oriented at a first bevel angle from a direction perpendicular to the MFS, the first bevel angle being greater than zero and less than ninety degrees, the second bevel being recessed from the MFS by a recess distance, being oriented at a second bevel angle from the direction perpendicular to the MFS and being offset from the first bevel by a taper having a taper angle, the taper angle greater than the first bevel angle, at least twenty degrees and not more than sixty degrees, the recess distance being not more than eighty nanometers and greater than zero, the additional portion having a thickness of at least ten nanometers and not more than sixty nanometers as measured from the first bevel, the first bevel and the second bevel forming at least a portion of the trailing surface;

a trailing shield having a pole-facing surface facing the trailing surface of the pole;

a write gap between the trailing shield and the pole; and at least one coil for energizing the pole.

2. The magnetic write apparatus of claim 1 wherein the pole-facing surface includes a first portion, a second portion and a third portion, the first portion of the pole-facing surface adjoining the MFS being oriented at a first trailing shield angle from the direction perpendicular to the MFS, the first trailing shield angle being substantially the same as the first bevel angle, the second portion of the pole-facing surface being oriented at a second trailing shield angle greater than the first trailing shield angle, the third portion of the pole-facing surface being oriented at a third trailing shield angle substantially the same as the second bevel angle, the second portion of the pole-facing surface being between the first portion and the third portion.

3. The magnetic write apparatus of claim 2 wherein the second trailing shield angle is substantially equal to the taper angle.

4. The magnetic write apparatus of claim 1 wherein the first bevel angle is at least twenty degrees and not more than thirty-five degrees.

5. The magnetic write apparatus of claim 1 wherein the thickness is at least twenty nanometers and not more than forty nanometers.

6. The magnetic write apparatus of claim 1 wherein the recess distance is at least twenty nanometers.

7. The magnetic write apparatus of claim 6 wherein the recess distance is at least thirty nanometers and not more than fifty nanometers.

8. The magnetic write apparatus of claim 1 wherein the additional portion has a width in a cross-track direction, the width increasing with increasing distance from the MFS.

9. The magnetic write apparatus of claim 1 further comprising:

an auxiliary pole adjacent to the trailing surface of the pole and recessed from the MFS; and wherein the additional portion extends to the auxiliary pole.

10. The magnetic write apparatus of claim 1 wherein the additional portion extends at least one hundred nanometers and not more than three microns from the MFS.

11. The magnetic write apparatus of claim 10 wherein the additional portion extends at least two hundred nanometers from the MFS.

12. The magnetic write apparatus of claim 1 wherein the additional portion terminates at a back surface, the back surface forming an angle with the direction perpendicular to the MFS, the angle being within ninety degrees from the direction perpendicular to the MFS.

13. The magnetic write apparatus of claim 12 wherein the angle is at least twenty degrees and not more than forty-five degrees from the direction perpendicular to the MFS.

14. The magnetic write apparatus of claim 1 wherein the second bevel angle is different from the first bevel angle.

15. The magnetic write apparatus of claim 1 wherein the second bevel angle equals the first bevel angle.

16. A data storage device comprising:

a media, a substrate having an media-facing surface (MFS), and a magnetic apparatus coupled with the substrate, the magnetic apparatus including a pole, a write gap, a trailing shield and at least one coil for energizing the pole, the pole including a leading surface, a trailing surface opposite to the leading surface, a main portion having a first bevel and an additional portion having a second bevel, the additional portion adjoining the main portion, the first bevel adjoining the MFS and being oriented at a first bevel angle from a direction perpendicular to the MFS, the first bevel angle being greater than zero and less than ninety degrees, the second bevel being recessed from the MFS by a recess distance, being oriented at a second bevel angle from the direction perpendicular to the MFS and being offset from the first bevel by a taper having a taper angle, the taper angle angle being greater than the first bevel angle, at least twenty degrees and not more than sixty degrees, the recess distance being less than eighty nanometers and greater than zero, the additional portion having a thickness of at least ten nanometers and not more than sixty nanometers as measured from the first bevel, the first bevel and the second bevel forming at least a portion of the trailing surface, the trailing shield having a pole-facing surface facing the trailing surface of the pole, the write gap being between the trailing shield and the pole.

17. The data storage device of claim 16 wherein the thickness is at least twenty nanometers and not more than forty nanometers.

18. The data storage device of claim 16 wherein the recess distance is at least twenty nanometers and not more than fifty nanometers.

19. The data storage device of claim 16 wherein the magnetic write apparatus further includes:

an auxiliary pole adjacent to the trailing surface of the pole and recessed from the MFS; and wherein the additional portion extends to the auxiliary pole.

20. The data storage device of claim 16 wherein the additional portion extends at least one hundred nanometers and not more than three microns from the MFS.

21. The data storage device of claim 16 wherein the additional portion terminates at a back surface, the back surface forming an angle with the direction perpendicular to the MFS, the angle being within forty-five degrees from the direction perpendicular to the MFS.

22. A method for providing a magnetic write apparatus having a media-facing surface (MFS) comprising:

providing a pole including a leading surface, a trailing surface opposite to the leading surface, a main portion having a first bevel and an additional portion having a second bevel, the additional portion adjoining the main portion, the first bevel adjoining the MFS and being oriented at a first bevel angle from a direction perpendicular to the MFS, the first bevel angle being greater than zero and less than ninety degrees, the second bevel being recessed from the MFS by a recess distance, being oriented at a second bevel angle from the direction perpendicular to the MFS and being offset from the first bevel by a taper having a taper angle, the taper angle being greater than the first bevel angle, at least twenty degrees and not more than sixty degrees, the recess distance being not more than eighty nanometers and greater than zero, the additional portion having a thickness of at least ten nanometers and not more than sixty nanometers as measured from the first bevel, the first bevel and the second bevel forming at least a portion of the trailing surface;

providing a trailing shield having a pole-facing surface facing the trailing surface of the pole;

providing a write gap between the trailing shield and the pole; and providing at least one coil for energizing the pole.

23. The method of claim 22 wherein the thickness is at least twenty nanometers and not more than forty nanometers.

24. The method of claim 22 wherein the recess distance is at least twenty nanometers and not more than fifty nanometers.

25. The method of claim 22 further comprising:

providing an auxiliary pole adjacent to the trailing surface of the pole and recessed from the MFS; and wherein the step of providing the pole further includes forming the additional portion such that the additional portion extends to the auxiliary pole.

26. The method of claim 24 wherein the additional portion extends at least one hundred nanometers and not more than three microns from the MFS.

27. The method of claim 22 wherein the additional portion terminates at a back surface, the back surface forming an angle with the direction perpendicular to the MFS, the angle being within forty-five degrees from the direction perpendicular to the MFS.

* * * * *